UNITED STATES PATENT OFFICE.

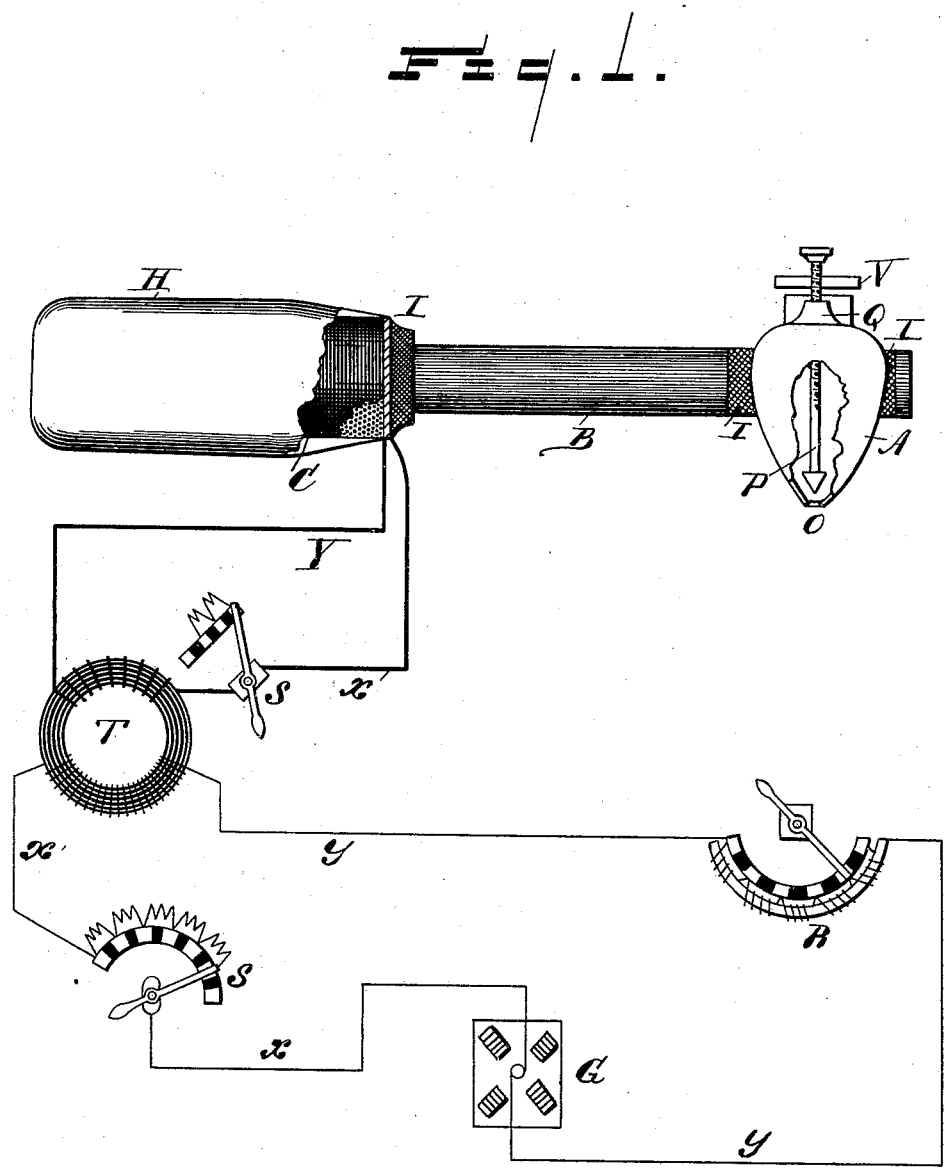

CHARLES L. COFFIN, OF DETROIT, MICHIGAN.

ELECTRICALLY-HEATED SOLDERING-TOOL.

SPECIFICATION forming part of Letters Patent No. 488,872, dated December 27, 1892.

Application filed June 11, 1892. Serial No. 436,400. (No model.)

*To all whom it may concern:*

Be it known that I, CHARLES L. COFFIN, of Detroit, in the county of Wayne and State of Michigan, have invented a new and useful Improvement in Electric Soldering or Brazing Tools, of which the following is a specification.

My invention consists in an improvement in electric soldering or brazing tools, hereinafter fully described and claimed.

The figure is a side elevation of the tool, partly in section, and a diagrammatic view of the circuit.

B represents the core, preferably formed of a bundle of soft iron wires, or laminated iron, or it may be of soft iron if preferred.

A represents a soldering head carried on said core B, and forming the secondary thereof. Head A is made hollow as shown in the drawing, and is provided with an orifice O, and a screw plug P for closing said orifice, and is also provided with a filling plug V.

Q represents a nut through which screw plug P works.

I represents insulating material, by which the secondary or soldering head A is insulated from core B.

C represents a coil of comparatively fine wire wound on insulating material I, over core B, the terminals of coil C being connected with a source of electric supply.

H represents an insulated covering above primary coil C, to serve as a handle for the tool.

G represents a generator of electricity whose poles are connected by the conductors *x* and *y* with the primary coil of a transformer T.

S represents resistance switches and R a reaction rheostat, by means of which the current through the primary coil of the transformer can be regulated at will.

The terminals of the primary coil C are connected with the secondary of the transformer T by conductors X and Y, in which may be a resistance switch S if desired.

The operation of my device is as follows: The head A is filled with melted solder through the plug V, said solder being retained in position by the screw plug P, which is turned down so as to close the orifice O. The generator being now set in motion, a current passes through the primary of transformer T, which current may be regulated by the resistance switch S, or rheostat R, a current is thereby induced in the secondary of said transformer which passes by means of conductors X and Y, regulated if desired, by resistance switch S through primary C, by which another current is induced in core B, and still another in soldering head A, this last induced current heating said head A until the solder therein is melted, when by retracting screw plug P to open orifice O, the solder may be laid upon the joint, as desired.

What I claim as my invention and desire to secure by Letters Patent, is:—

1. In an apparatus for electric soldering or brazing a hollow soldering or brazing head, constituting the secondary coil or circuit of an induction apparatus, adapted to contain solder or brazing material, in combination with means for regulating the flow of solder, substantially as shown and described.

2. In an apparatus for electric soldering or brazing, a hollow soldering or brazing head constituting the secondary coil or circuit of an induction apparatus and adapted to contain fluid solder or brazing material, substantially as shown and described.

3. A magnetic core and a high resistance primary coil thereon in combination with a secondary circuit of general low resistance including a soldering or brazing head having an orifice therein for containing solder or fluid metal alloy or brazing material.

4. Apparatus for electric soldering or brazing, employing electric current as the heating agent and consisting of a source of current of relatively high electromotive force, in combination with a switch and rheostat, and a transformer or converter whose secondary circuit carrying a large volume of electric current includes a soldering or brazing head adapted to contain solder or brazing material and be heated by said current.

5. In an electric soldering or brazing tool, an electric transformer, having as a portion of its secondary circuit a soldering or brazing head adapted to contain solder or brazing material.

CHARLES L. COFFIN.

Witnesses:
GERTRUDE H. ANDERSON,
GEO. H. LOTHROP.